(12) United States Patent
Kochiev

(10) Patent No.: US 12,732,895 B2
(45) Date of Patent: Sep. 8, 2026

(54) COVERAGE BASED DYNAMIC RADIO RESOURCE PARTITIONING

(71) Applicant: T-MOBILE INNOVATIONS LLC, Overland Park, KS (US)

(72) Inventor: Timur Kochiev, Irvine, CA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 282 days.

(21) Appl. No.: 18/676,093

(22) Filed: May 28, 2024

(65) Prior Publication Data

US 2025/0374170 A1 Dec. 4, 2025

(51) Int. Cl.
*H04W 48/08* (2009.01)
*H04W 28/02* (2009.01)
*H04W 48/06* (2009.01)

(52) U.S. Cl.
CPC ....... *H04W 48/08* (2013.01); *H04W 28/0236* (2013.01); *H04W 48/06* (2013.01)

(58) Field of Classification Search
CPC .. H04W 48/08; H04W 28/0236; H04W 48/06
See application file for complete search history.

(56) References Cited

U.S. PATENT DOCUMENTS

2010/0172311 A1* 7/2010 Agrawal ............... H04L 5/0048 370/329
2021/0219143 A1* 7/2021 Khalid .................. H04W 76/27
2025/0374111 A1* 12/2025 Wang ................ H04W 28/0263

OTHER PUBLICATIONS

Chiaraviglio, Luca, et al. "Measuring 5G Exposure From Multiple Terminals and Base Station in Standalone FWA Networks." IEEE Access (2025). (Year: 2025).*

* cited by examiner

*Primary Examiner* — Sharad Rampuria
(74) *Attorney, Agent, or Firm* — Shook, Hardy & Bacon L.L.P.

(57) ABSTRACT

At a high level, the technology disclosed herein relates to dynamic Radio Resource Partitioning (RRP). In embodiments, radio frequency (RF) coverage data for one or more Fixed Wireless Access (FWA) devices (or other devices) may be received. The RF coverage data may correspond to one or more of reported channel state information feedback (e.g., Channel Quality Indicator (CQI)) from Enhanced Mobile Broadband (eMBB) user devices, particular identifiers (e.g., Service Profile Identifier (SPID)), slicing data, etc., or one or more combinations thereof. A threshold for the FWA device may be determined based on historical eMBB resource data for a particular access point. If particular RF coverage data is below the threshold, the FWA device may be blocked from RRP. If the RF coverage data is above the threshold, the FWA device may be included for RRP.

19 Claims, 4 Drawing Sheets

COVERAGE BASED DYNAMIC RADIO RESOURCE PARTITIONING

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

According to various aspects of the technology disclosed herein, systems, methods, media, etc., are provided for coverage based dynamic radio resource partitioning. In embodiments, radio frequency (RF) coverage data may be received for a Fixed Wireless Access (FWA) device. The RF coverage data may be associated with one or more of reported channel state information feedback (e.g., Channel Quality Indicator (CQI), Received Signal Strength Indicator (RSSI), Reference Signal Received Power (RSRP), Reference Signal Received Quality (RSRQ), Signal-to-Interference-plus-Noise Ratio (SINR), etc.) from eMBB user devices, International Mobile Equipment Identity Software Version Type Allocation Code (IMEI SV TAC) categories, Service Profile Identifier (SPID) categories, slicing (e.g., a particular slicing group for RRP), etc., or one or more combinations thereof.

Based on the RF coverage data, an RF coverage threshold (e.g., a dynamic threshold that changes depending on historical data for an access point) may be determined for the FWA device (e.g., based on historical Enhanced Mobile Broadband (eMBB) resource data for an access point associated with the FWA device). In some embodiments, one or more machine learning techniques may be used to determine the RF coverage threshold. In some embodiments, different RF coverage thresholds are determined for different FWA devices based on their associated access points and the historical eMBB resource data for each access point. If particular RF coverage data is below the threshold, the FWA device may be blocked from RRP. If the RF coverage data is above the threshold, the FWA device may be included for RRP.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
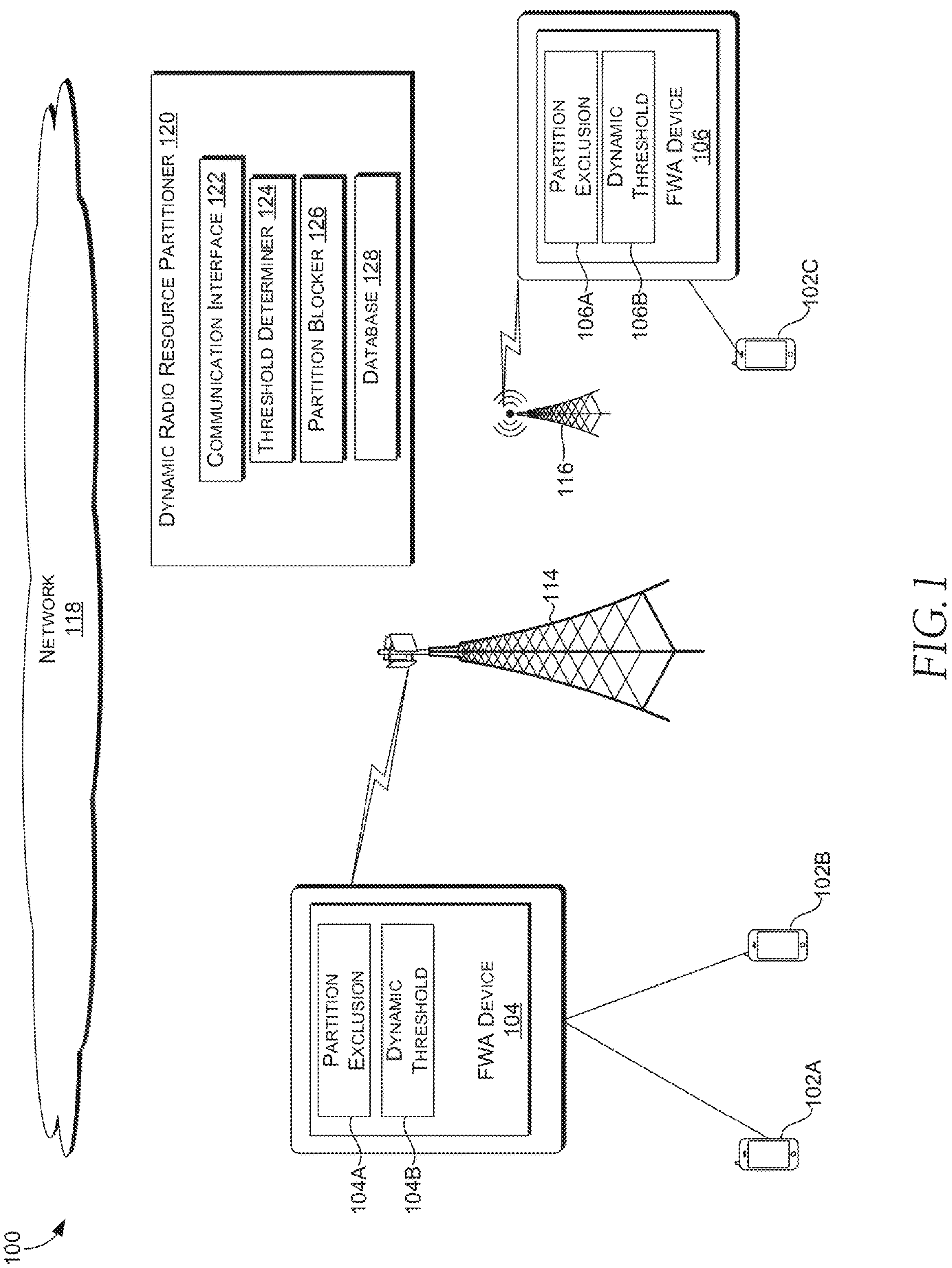
FIG. 1 depicts an example operating environment for the dynamic radio resource partitioner, in accordance with embodiments herein.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms “step” and/or “block” may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention may be embodied in many different forms and should not be construed as limited to the aspects set forth herein.

Definitions

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms may be found in Newton’s Telecom Dictionary, (e.g., 32d Edition, 2022).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components may store data momentarily, temporarily, or permanently.

"Computer storage media" does not comprise signals per se.

For purposes of this disclosure, the word "including" or "having" has the same broad meaning as the word "comprising." Further, the word "communicating" has the same broad meaning as the word "receiving," or "transmitting" facilitated by software or hardware-based buses, receivers, or transmitters using communication media.

In addition, words such as "a" and "an," unless otherwise indicated to the contrary, include the plural as well as the singular. Thus, for example, the constraint of "a feature" is satisfied where one or more features are present. Additionally, an element in the singular may refer to "one or more."

The term "some" may refer to "one or more."

The term "or" includes the conjunctive, the disjunctive, and both (a or b thus includes either a or b, as well as a and b).

The phrase "one or more combinations thereof" may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Technological Overview

By way of background, Radio Resource Partitioning (RRP) is a technique used in wireless communication systems (e.g., associated with Fixed Wireless Access (FWA) and Enhanced Mobile Broadband (eMBB)) for the management and allocation of radio resources among various users or services. RRP helps with the distribution of available radio frequency (RF) resources to various devices. For example, RRP may include the division of available radio spectrum into separate radio resource groups based on, e.g., network slicing information or SPID, which may be assigned to a particular user or device. In some instances, in FWA deployments, different radio resource groups may be allocated for residential FWA devices, commercial FWA devices, and industrial FWA devices. The network slicing may be defined via network slice selection assistance information (NSSAI). In other instances, different radio resource groups may be allocated for eMBB-associated high-speed data, voice services, and Internet of Things devices. As an example, eMBB high-definition video streaming or online gaming may be allocated higher priorities.

During instances associated with resource contention (e.g., high network congestion) among eMBB users, RRP may be used to limit radio resources for some FWA devices (e.g., limiting various FWA devices up to 30% of the radio resources), so that remaining resources are used for eMBB (e.g., such that 70% of the radio resources are used for eMBB services) so that particular eMBB users can have a particular throughput for these services. As a result, this can negatively affect particular users based on the resources being allocated for these eMBB services, since radio resources are being taken away for the prioritized eMBB users to meet that throughput target. In this way, there are instances wherein the RRP causes decreased quality of services for particular FWA devices and user devices, as well as a decreased quality of user experiences.

Embodiments of the technology discussed herein provide various improvements to the radio resource challenges discussed above. For example, the technology described herein can improve radio resource distribution to user devices and other types of wireless communication devices (e.g., FWA devices, wireless customer premises equipment (CPE), wireless routers, etc.) in situations where the RRP reduces radio resources for those devices. By way of example, embodiments of the present technology may include controlling which eMBB user devices can be used for particular radio resource distribution and optimization via the RRP.

For instance, controlling RRP of eMBB user devices may be done by grouping eMBB user devices based on RF coverage, wherein this grouping is determined based on one or more of reported channel state information feedback (e.g., Channel Quality Indicator (CQI)) from eMBB user devices, International Mobile Equipment Identity Software Version Type Allocation Code (IMEI SV TAC) categories, Service Profile Identifier (SPID) categories, slicing (e.g., a particular slicing group for RRP), etc., or one or more combinations thereof. Based on the RF coverage grouping, the group of devices (e.g., FWA devices) having a particular RF coverage factor over a threshold (e.g., a CQI threshold) will be included in the dynamic RRP procedure, and the group of devices having the particular RF coverage factor below the threshold will be excluded, or blocked, from the RRP procedure. In some embodiments, the threshold will be a dynamic threshold based on machine learning techniques using the various RF coverage factors.

In an embodiment, a system for dynamic Radio Resource Partitioning (RRP) is provided. The system may comprise one or more processors and computer memory storing computer-usable instructions that, when executed by the one or more processors, cause the one or more processors to perform operations. The operations may comprise receiving radio frequency (RF) coverage data for a Fixed Wireless Access (FWA) device. The operations may also comprise determining that the RF coverage data for the FWA device is below a threshold. The operations may also comprise blocking the FWA device from RRP based on the RF coverage data being below the threshold.

In some embodiments, the operations may also comprise determining the threshold for the FWA device based on historical Enhanced Mobile Broadband (eMBB) resource data for an access point associated with the FWA device. For example, determining the threshold for the FWA device comprises applying one or more machine learning models to the historical eMBB resource data comprising eMBB resource usage by a plurality of user devices that correspond to a cell identity associated with the access point and the FWA device. In some embodiments, a particular threshold may be determined for the FWA device, such that this particular threshold applies for a particular day during a particular time based on the historical eMBB resource data.

In another embodiment, a method is provided for dynamic Radio Resource Partitioning (RRP). The method may comprise receiving, via a Fixed Wireless Access (FWA) device, a radio frequency (RF) coverage threshold for RRP. The method may also comprise transmitting, via the FWA device, an indication that RF coverage data for the FWA device is below the RF coverage threshold. The method may also comprise receiving, via the FWA device, an indication of exclusion from the RRP based on transmitting the indication.

In another example embodiment, one or more computer storage media having computer-executable instructions embodied thereon, that when executed by at least one processor, cause the at least one processor to perform a method. The method may comprise receiving radio frequency (RF) coverage data for a Fixed Wireless Access (FWA) device. The method may also comprise determining an RF coverage threshold for the FWA device based on historical Enhanced Mobile Broadband (eMBB) resource data for an access point associated with the FWA device. The method may also comprise determining that the RF coverage data for the FWA device is below the RF coverage threshold. Based on the RF coverage data being below the RF coverage threshold, the FWA device may be blocked from Radio Resource Partitioning (RRP).

Example Operating Environments

Turning now to FIG. 1, example operating environment 100 is illustrated in accordance with one or more embodiments disclosed herein. At a high level, the example operating environment 100 comprises user devices 102A and 102B corresponding to FWA device 104 having partition exclusion 104A and dynamic threshold 104B, user device 102C corresponding to FWA device 106 having partition exclusion 106A and dynamic threshold 106B, base station 114 corresponding to FWA device 104 and access point 116 corresponding to FWA device 106, network 118, and dynamic radio resource partitioner 120 comprising communication interface 122, threshold determiner 124, partition blocker 126, and database 128.

Example operating environment 100 is but one example of a suitable environment for the technology and techniques disclosed herein, and is not intended to suggest any limitation as to the scope of use or functionality of the invention. Neither should the environment 100 be interpreted as having any dependency or requirement relating to any one or combination of components illustrated. For example, other embodiments of example operating environment 100 may have additional user devices, FWA devices, other types of devices (e.g., other types of short-range wireless technology devices), or other configurations of database 128 (e.g., database 128 may be a distributed computing environment encompassing multiple computing devices for storing one or more of the historical Enhanced Mobile Broadband (eMBB) resource data separately).

One or more of the user devices 102A, 102B, and 102C may be a device that has the capability of communicating (e.g., transmitting or receiving one or more signals to or from) with one or more of the FWA device 104, FWA device 106, base station 114, access point 116, and dynamic radio resource partitioner 120 over the network 118. In some embodiments, the user devices 102A, 102B, and 102C may be referred to as a "user device," "computing device," "mobile device," "client," "user equipment (UE)," or "wireless communication device." The user devices 102A, 102B, and 102C, in some implementations, may take on a variety of forms, such as a PC, a laptop computer, a tablet, a mobile phone, a PDA, a server, an internet-of-things device, a wireless local loop station, an Internet of Everything device, a machine type communication device, an evolved or enhanced machine type communication device, or any other device that is capable of communicating over the network 118.

One or more of the FWA device 104 and FWA device 106 may be a device that has the capability of communicating (e.g., transmitting or receiving one or more signals to or from) with one or more of the user devices 102A, 102B, and 102C, base station 114, access point 116, and dynamic radio resource partitioner 120 over the network 118. In some embodiments, the FWA devices 104 and 106 may be a wireless customer premises equipment (CPE), a wireless router, a mobile hotspot, a fixed wireless terminal, a residential gateway, another type of short-range wireless technology device, etc. The FWA device 104 and FWA device 106 may be, in an embodiment, short-range wireless technology device 400 described herein with respect to FIG. 4.

In embodiments, the network 118 may include one or more of a local area network (LAN), a wide area network (WAN), a mesh network, a hybrid network, a plurality of networks, another type of network, or one or more combinations thereof. In some embodiments, one or more of the user devices 102A, 102B, and 102C, FWA device 104 and FWA device 106, base station 114, access point 116, and dynamic radio resource partitioner 120 may communicate over the network 118 (e.g., via the Internet, another public or private network, etc., or one or more combinations thereof). In some embodiments, the network 118 includes 5G standalone technology (independent of 4G technology), 5G non-standalone technology, LTE network technology, another generation network technology, IEEE 802.11, etc., or one or more combinations thereof.

In embodiments, the dynamic radio resource partitioner 120 may comprise one or more computing devices (e.g., user device 102A). In some embodiments, the dynamic radio resource partitioner 120 may be a single server, a distributed computing environment encompassing multiple computing devices located at the same physical geographical location or at different physical geographical locations, another type of server environment, etc. In embodiments, the dynamic radio resource partitioner 120 may comprise one or more processors, one or more electronics devices, one or more hardware devices, one or more electronics components, one or more logical circuits, one or more memories, one or more software codes, one or more firmware codes, etc., or one or more combinations thereof.

The dynamic radio resource partitioner 120 may utilize communication interface 122 for communications with the FWA device 104 (e.g., associated with partition exclusion 104A and dynamic threshold 104B) and with the FWA device 106 (e.g., associated with partition exclusion 106A and dynamic threshold 106B). In embodiments, dynamic radio resource partitioner 120 may communicate (e.g., via transmission or reception of signals) with the FWA device 104 and the FWA device 106 via the communication interface 122 based on one or more of control signaling, a downlink transmission, FWA device decoding operations, a scheduling policy, a modulation scheme, an RRP procedure, a reporting message, etc., or one or more combinations thereof.

In some embodiments, the dynamic radio resource partitioner 120 may communicate with the FWA device 104 and the FWA device 106 via the communication interface 122 based on particular operations of the threshold determiner 124 and the partition blocker 126 of the dynamic radio resource partitioner 120 (e.g., for communications associated with the partition exclusion 104A and dynamic threshold 104B of the FWA device 104, or the partition exclusion

106A and dynamic threshold 106B of the FWA device 106, for performance of the example flowchart 300 by the FWA device 104 or the FWA device 106).

In some embodiments, the threshold determiner 124 may determine an RF coverage threshold for the FWA device 104 or the FWA device 106 based on historical Enhanced Mobile Broadband (eMBB) resource data stored at the database 128. For example, the dynamic radio resource partitioner 120 may store eMBB resource data for an access point (e.g., base station 114 or access point 116) associated with particular FWA devices. For example, the dynamic radio resource partitioner 120 may store eMBB resource data for base station 114 associated with FWA device 104 and eMBB resource data for access point 116 associated with FWA device 106. By way of illustration, in some embodiments, the base station 114 or access point 116 may include one or more of a macro base station, a small cell, an eNodeB, a small cell eNodeB, a gNodeB, a relay base station, picocell (e.g., a standalone or distributed antenna system), femtocell, microcell, metrocell, an indoor distributed antenna system, another type of access point, or one or more combinations thereof. In some embodiments, the base station 114 may include a larger antenna system than the access point 116 (e.g., wherein the base station 114 is a macro base station and the access point 116 is a microcell or a Wi-Fi access point). In some embodiments, the database 128 may store historical eMBB resource data for each of the base station 114 and the access point 116 separately, or each specific cell of the coverage area for the base station 114 separately and each specific cell of the coverage area for the access point 116 separately.

In embodiments, the threshold determiner 124 may determine a first RF coverage threshold for the FWA device 104 based on historical eMBB resource data from a plurality of eMBB user devices (e.g., user devices 102A and 102B) associated with the base station 114 and associated with a specific cell of the coverage area of the base station 114 that the FWA device 104 is utilizing. In some embodiments, the first RF coverage threshold for the FWA device 104 may be based on a location of the FWA device 104 (e.g., based on the FWA device 104 being over a threshold distance from the base station 114). In some embodiments, the first RF coverage threshold for the FWA device 104 may be based on an International Mobile Equipment Identity Software Version Type Allocation Code (IMEI SV TAC) associated with the FWA device 104, a Service Profile Identifier (SPID) associated with the FWA device 104, slicing data (e.g., slicing group identifiers associated with a service, partitioning characteristics, quality of service requirements, time slots, frequency bands, modulation scheme, power level, etc.) associated with the FWA device 104, etc., or one or more combinations thereof.

In embodiments, the threshold determiner 124 may determine a second RF coverage threshold for the FWA device 106 based on historical eMBB resource data from a plurality of eMBB user devices associated with the access point 116 (e.g., user device 102C) and associated with a specific cell of the coverage area of the access point 116 that the FWA device 106 is utilizing. In some embodiments, the second RF coverage threshold for the FWA device 106 may be based on a location of the FWA device 106 (e.g., based on the FWA device 106 being over a threshold distance from the access point 116). In some embodiments, the second RF coverage threshold for the FWA device 106 may be based on an IMEI SV TAC associated with the FWA device 106, an SPID associated with the FWA device 106, slicing data associated with the FWA device 106, etc., or one or more combinations thereof.

In embodiments, the threshold determiner 124 may determine one or more RF coverage thresholds based on one or more of a Channel Quality Indicator (CQI), Received Signal Strength Indicator (RSSI), Signal-to-Interference-plus-Noise Ratio (SINR), Reference Signal Received Power (RSRP), Reference Signal Received Quality (RSRQ), etc., from the eMBB user devices. For example, the threshold determiner 124 may determine the first RF coverage threshold for the FWA device 104 based on historical eMBB resource data, from the plurality of eMBB user devices, including one or more of the historical CQI, RSSI, SINR, RSRP, RSRQ, etc. In some embodiments, the RF coverage threshold may correspond to SINR of 5 dB, RSRP of −105 dBm, and RSRQ of −20 dBm. In some embodiments, the RF coverage threshold may correspond to a SINR within a range of 0 to 5 dB. In some embodiments, the RF coverage threshold may correspond to an RSRP within a range of −115 to −124 dBm.

Upon the dynamic radio resource partitioner 120 determining that the RF coverage data for the FWA device 104 or the FWA device 106 is below the corresponding RF coverage threshold, the partition blocker 126 of the dynamic radio resource partitioner 120 may block that FWA device from Radio Resource Partitioning (RRP). In embodiments, that FWA device may be blocked for a particular period of time. In some embodiments, that FWA device may be provided one or more downlinks based on the blocking of the RRP. In this way, that particular FWA device and its corresponding user devices are not negatively affected from RRP resource restrictions that take away radio resources from these devices for allocation to other eMBB users. Upon determining that particular RF coverage data for the FWA device 104 or the FWA device 106 is not below the corresponding RF coverage threshold, the dynamic radio resource partitioner 120 may include the that FWA device for the RRP partitioning.

Example Flowchart

Figure 2:
FIG. 2 depicts an example flowchart from the perspective of the dynamic radio resource partitioner, in accordance with embodiments herein.
Figure 2:
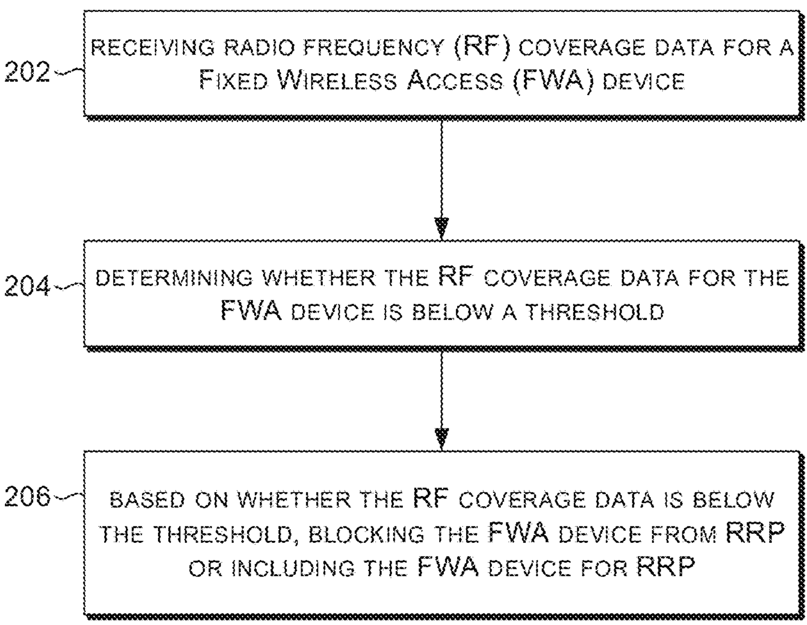

Having described the example embodiments discussed above, an example flowchart is described below with respect to FIG. 2. Example flowchart 200 begins at step 202 with receiving radio frequency (RF) coverage data for a Fixed Wireless Access (FWA) device. In embodiments, the FWA device is FWA device 104 or FWA device 106 of FIG. 1, or the short-range wireless technology device 400 of FIG. 4. In embodiments, the RF coverage data may include one or more of a Channel Quality Indicator (CQI), Received Signal Strength Indicator (RSSI), Signal-to-Interference-plus-Noise Ratio (SINR), Reference Signal Received Power (RSRP), Reference Signal Received Quality (RSRQ), etc., from eMBB user devices, International Mobile Equipment Identity Software Version Type Allocation Code (IMEI SV TAC), Service Profile Identifier (SPID), slicing data (e.g., slicing group identifiers associated with a service, partitioning characteristics, quality of service requirements, time slots, frequency bands, modulation scheme, power level, etc.), etc., or one or more combinations thereof.

Step 204 includes determining that the RF coverage data for the FWA device is below a threshold. For example, the threshold determiner 124 of the dynamic radio resource partitioner 120 of FIG. 1 may determine the RF coverage threshold. By way of example, the RF coverage threshold may be determined for the FWA device based on historical Enhanced Mobile Broadband (eMBB) resource data for an access point associated with the FWA device. The historical eMBB resource data may include eMBB resource usage by a plurality of user devices each associated with one or more FWA devices that are all associated with a particular cell identity of the access point. For example, the cell identity may refer to a specific cell within a coverage area of the access point (e.g., a physical cell identity (PCI) (e.g., including 36-bit value identifier), a particular Wi-Fi identifier, etc.). In some embodiments, the RF coverage threshold is a dynamic RF coverage threshold that changes based on a particular time during a particular day based on the historical eMBB resource data.

In some embodiments, one or more machine learning models may be applied to the historical eMBB resource data to determine RF coverage threshold. For example, the one or more machine learning models may include a neural network, a convolutional neural network, random forest models, a regression model, a classification model, a generative adversarial network, variational autoencoders, autoencoders, sequence generative models, etc., or one or more combinations thereof. To illustrate, the one or more machine learning models may analyze historical CQI, RSSI, SINR, RSRP, RSRQ, etc., from eMBB user devices associated with a specific cell for a particular access point during particular time periods.

The historical measurements from the eMBB user devices may be analyzed based on particular traffic congestion patterns (e.g., the historical measurements may be grouped based on high congestion periods and low congestion periods). As another example, the historical measurements from the eMBB user devices may be analyzed based on a particular distance of the FWA device from the access point (e.g., the historical measurements may be grouped based on cell edge devices and closer devices, and then provided to the machine learning model). In yet another example, the historical measurements from the eMBB user devices may be grouped by International Mobile Equipment Identity Software Version Type Allocation Code (IMEI SV TAC) or the Service Profile Identifier (SPID) and then provided to the machine learning model.

In some example embodiments, determining that the RF coverage data for the FWA device is below the RF coverage threshold may include the following: SINR<5 dB, RSRP<−105 dBm. As another example embodiment, determining that the RF coverage data for the FWA device is below the RF coverage threshold may include the following: SINR<6 dB, RSRP<−100 dBm. As another example embodiment, determining that the RF coverage data for the FWA device is above the RF coverage threshold may include the following: SINR>10 dB, RSRP>−95 dBm. As another example embodiment, determining that the RF coverage data for the FWA device is above the RF coverage threshold may include the following: SINR>5 dB, RSRP>−105 dBm.

In some embodiments, it may be determined that a second threshold for the FWA device applies for a particular day during a particular time based on applying the one or more machine learning models to the historical eMBB resource data. By way of example, the RF coverage threshold during lower network traffic periods may include 6 dB SINR and RSRP-101, and the second threshold applying for higher network traffic periods may include 5 dB SINR and RSRP-106. Additional sets of RF coverage data may be received for the FWA device during the periods in which the different thresholds apply. For example, a second set of RF coverage data may be received for the FWA device during the particular day and the particular time associated with the second threshold.

In some embodiments, different thresholds may be determined for other FWA devices in another specific cell of the access point, as well as different thresholds for other FWA devices utilizing different access points. For example, a second threshold may be determined for a second FWA device based on a second set of historical eMBB resource data for a different access point that is associated with the second FWA device, wherein the second threshold for the second FWA device is different than the threshold for the FWA device. The second threshold may be determined by applying the one or more machine learning models to the historical eMBB resource data for the different access point, such as the historical eMBB resource data for the specific cell in which the second FWA device is located in for utilizing the different access point. Additionally, determinations may be made as to whether a second set of RF coverage data for the second FWA device is below the second threshold. In some embodiments, the threshold and second threshold may be adjusted based on receiving additional eMBB resource data for the various access points and their associated specific cells.

Step 206 includes blocking the FWA device from RRP based on determining that the RF coverage data for the FWA device is below the threshold or including the FWA device for RRP based on determining that the RF coverage data for the FWA device is above the threshold. In some embodiments, based on the RF coverage data being below a threshold, the FWA device may be blocked from the RRP during the particular day and the particular time associated with the particular threshold. For example, an initial determination may be made that RF coverage data for the FWA device is below the threshold, and the FWA device may be blocked from RRP during a particular period of time. Afterwards, another determination may be made that a second set of RF coverage data for the FWA device is above the second threshold, and the FWA device may then be included for the RRP during for a particular time period.

Figure 3:
FIG. 3 depicts an example flowchart from the perspective of the fixed wireless access (FWA) device, in accordance with embodiments herein.
Figure 3:
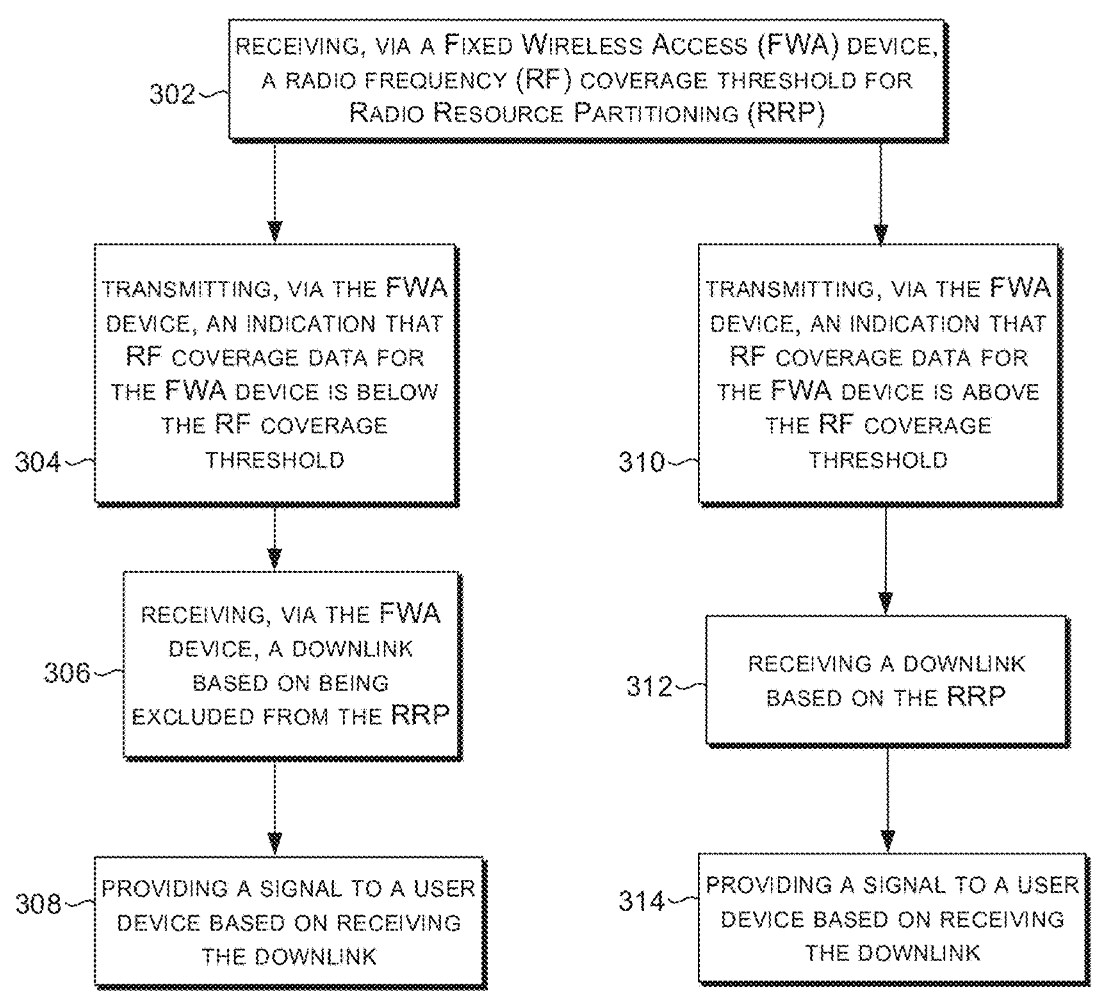

Another example flowchart is now described below with respect to FIG. 3. Example flowchart 300 begins at step 302 with receiving, via a Fixed Wireless Access (FWA) device, a radio frequency (RF) coverage threshold for Radio Resource Partitioning (RRP). In embodiments, the FWA device is FWA device 104 or FWA device 106 of FIG. 1, or the short-range wireless technology device 400 of FIG. 4. In embodiments, the RF coverage threshold corresponds to dynamic threshold 104B or 106B of FIG. 1. In some embodiments, the RF coverage threshold is received from the dynamic radio resource partitioner 120 of FIG. 1 (e.g., over the network 118 via base station 114 or access point 116 of FIG. 1).

At step 304, the FWA device transmits an indication (e.g., over the network 118 of FIG. 1) that RF coverage data for the FWA device is below the RF coverage threshold. In embodiments, this indication may correspond to a control signal message associated with the base station 114 or access point 116 of FIG. 1. In embodiments, this indication may correspond to a device report status or other message to the base station 114 or access point 116 of FIG. 1. In some embodiments, the indication that RF coverage data for the FWA device is below the RF coverage threshold may include one or more of a CQI, RSSI, SINR, RSRP, RSRQ, etc. from the FWA device (e.g., an eMBB user device), wherein the CQI, RSSI, SINR, RSRP, RSRQ, etc. correspond to a particular access point and a particular access point coverage area (e.g., associated with a cell identity that uniquely identifies a specific cell within an access point provided coverage area, such as a physical cell identity (PCI) (e.g., including 36-bit value identifier)). In some embodiments, the indication that RF coverage data for the FWA device is below the RF coverage threshold may include one or more of IMEI SV TAC, SPID, slicing data (e.g., slicing group identifiers associated with a service, partitioning characteristics, quality of service requirements, time slots, frequency bands, modulation scheme, power level, etc.), etc., or one or more combinations thereof.

At step 306, the FWA device may receive a downlink based on being excluded from the RRP. In some embodiments, the downlink may be received from the base station 114 or access point 116 of FIG. 1. For example, the downlink may be associated with the Internet, multimedia content, Voice over Internet Protocol, another type of communication service, etc. In some embodiments, the downlink may be received in response to or during the receipt of an indication of exclusion from the RRP based on transmitting the indication that RF coverage data for the FWA device is below the RF coverage threshold. For example, the indication of exclusion from the RRP may be included in a control signal message or a channel quality message for a modulation scheme. In some embodiments, the downlink may be provided to the FWA device based on one or more beamforming techniques. Additionally, based on receiving the downlink, the FWA device may provide a signal to a user device at step 308 (e.g., for Internet, multimedia content, Voice over Internet Protocol, another type of communication service, etc.).

At step 310, based on receiving the RF coverage threshold at step 302, the FWA device transmits an indication (e.g., over the network 118 of FIG. 1) that RF coverage data for the FWA device is above the RF coverage threshold. In embodiments, this indication may correspond to a control signal message associated with the base station 114 or access point 116 of FIG. 1. In embodiments, this indication may correspond to a device report status or other message to the base station 114 or access point 116 of FIG. 1. In some embodiments, the indication that RF coverage data for the FWA device is above the RF coverage threshold may include one or more of a CQI, RSSI, SINR, RSRP, RSRQ, etc. from the FWA device (e.g., an eMBB user device), wherein the CQI, RSSI, SINR, RSRP, RSRQ, etc. In some embodiments, the indication that RF coverage data for the FWA device is above the RF coverage threshold may include one or more of IMEI SV TAC, SPID, slicing data, etc., or one or more combinations thereof.

At step 312, the FWA device may receive a downlink based on transmitting the indication that RF coverage data for the FWA device is above the RF coverage threshold and based on being included for the RRP. In some embodiments, the RRP associated downlink may be received from the base station 114 or access point 116 of FIG. 1. For example, the RRP associated downlink may correspond to a partitioned frequency band for residential, commercial, industrial, etc., applications, high-speed data, voice data, internet of things devices, high-definition video streaming, online gaming, voice over IP, video conferences, etc. In some embodiments, the RRP associated downlink may be received in response to or during the receipt of an indication of inclusion for the RRP based on transmitting the indication that RF coverage data for the FWA device is above the RF coverage threshold. Additionally, based on receiving the RRP associated downlink, the FWA device may provide a signal to a user device at step 314 (e.g., for residential, commercial, industrial, etc., applications, high-speed data, voice data, internet of things devices, high-definition video streaming, online gaming, voice over IP, video conferences, etc.).

In some embodiments, the FWA device may additionally (e.g., at later times) transmit additional indications (e.g., a second indication) that the RF coverage data for the FWA device is above the RF coverage threshold, and provide signals to the user device based on receiving a downlink in response to these additional indications. As another example, in some embodiments, the FWA device may receive additional RF coverage thresholds (e.g., a second RF coverage threshold), and subsequently transmit additional indications as to whether the RF coverage data for the FWA device is below the second RF coverage threshold.

Example Short-Range Wireless Technology Device

Figure 4:
FIG. 4 depicts an example short-range wireless technology device associated with the present technology, in accordance with embodiments herein.
Figure 4:
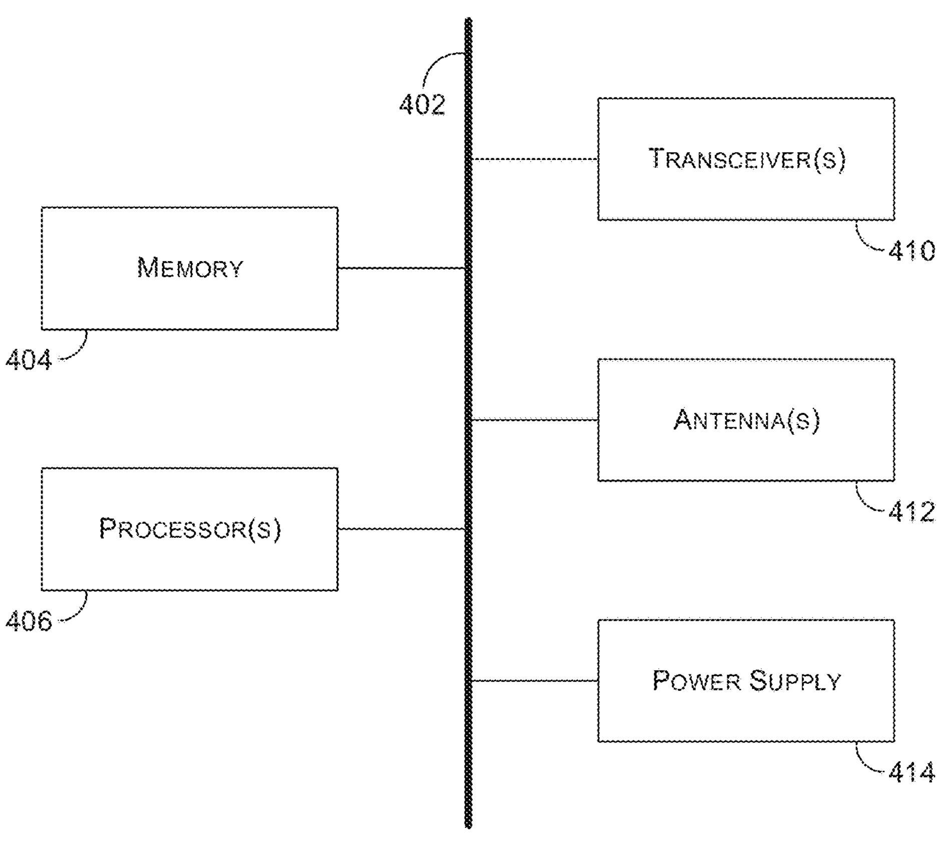

Referring now to FIG. 4, a diagram is depicted of an example short-range wireless technology device suitable for use in implementations of the present disclosure. In particular, the example computer environment is shown and designated generally as short-range wireless technology device 400. Short-range wireless technology device 400 is but one example of a suitable computing environment and is not intended to suggest any limitation as to the scope of use or functionality of the invention. Neither should short-range wireless technology device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, short-range wireless technology device 400 includes bus 402 that may directly or indirectly couple the following components or devices: memory 404, one or more processors 406, transceiver(s) 410, antenna(s) 412, and power supply 414. Although the components of FIG. 4 are shown with lines for the sake of clarity, in reality, delineating various components is not so clear, and metaphorically, the lines would more accurately be grey and fuzzy. For example, processors, such as one or more processors 406, have memory. The present disclosure hereof recognizes that such is the nature of the art, and reiterates that FIG. 4 is merely illustrative of an example computing environment for a short-range wireless technology device that may be used in connection with one or more implementations of the present disclosure. In yet another example, bus 402 may represent what may be one or more busses (such as an address bus, data bus, or combination thereof).

Bus 402 may facilitate communication among the memory 404, one or more processors 406, transceiver(s) 410, antenna(s) 412, and power supply 414. For example, bus 402 may facilitate data transfer, control signal communications, power distribution, etc., between one or more of the memory 404, one or more processors 406, transceiver(s) 410, antenna(s) 412, and power supply 414. In embodiments, the bus 402 may include one or more of a peripheral component interconnect express (e.g., for the connection of network interface cards, storage drives, specialized accelerators, etc.), a universal serial bus, a serial peripheral interface, an inter-integrated circuit, a universal asynchronous receiver-transmitter, Ethernet, power bus, etc.

Short-range wireless technology device 400 typically includes a variety of computer-readable media. Computer-readable media may be any available media that may be accessed by short-range wireless technology device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media may include RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

In embodiments, memory 404 includes computer-storage media in the form of volatile and/or nonvolatile memory. Memory 404 may be removable, non-removable, or a combination thereof. Examples of memory 404 may include solid-state memory, hard drives, optical-disc drives, etc., or one or more combinations thereof.

Short-range wireless technology device 400 also includes one or more processors 406 that read data from various components, such as bus 402, memory 404, transceiver(s) 410, antenna(s) 412, or power supply 414. Examples of one or more processors 406 may include microprocessors, microcontrollers, graphics processing units (GPUs), central processing units (CPUs), application processors, application-specific integrated circuits, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, other types of processors, or one or more combinations thereof.

Transceiver(s) 410 and antenna(s) 412 may facilitate communication with a wireless telecommunications network (e.g., code-division multiple access (CDMA) network, general packet radio service (GPRS) network, TDMA, global system for mobile communication (GSM) network, etc.). The transceiver(s) 410 may perform signal amplification, filtering, frequency conversion. In embodiments, the transceiver(s) 410 and antenna(s) 412 may enable the short-range wireless technology device 400 to communicate (e.g., with the user devices 102A-102C, the base station 114, access point 116, the network 118 of FIG. 1) by receiving and converting RF signals. In embodiments, the transceiver(s) 410 and antenna(s) 412 may enable communications via radio frequency identification (RFID), near-field communications, Wi-Fi (IEEE 802.11) other short-range wireless communications, etc. As can be appreciated, in various embodiments, the transceiver(s) 410 and antenna(s) 412 may be configured to support multiple technologies.

A wireless telecommunications network might include an array of devices, which are not shown so as to not obscure more relevant aspects of the invention. Network components, such as a base station, a communications tower, one or more satellites, other access points (as well as other network components), or one or more combinations thereof, may provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

In the preceding Detailed Description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for dynamic Radio Resource Partitioning (RRP), the system comprising:

one or more processors; and computer memory storing computer-usable instructions that, when executed by the one or more processors, cause the one or more processors to perform operations comprising:

receiving radio frequency (RF) coverage data for a Fixed Wireless Access (FWA) device; determining that the RF coverage data for the FWA device is below a threshold; and based on the RF coverage data being below the threshold, blocking the FWA device from RRP;

determining a second threshold for the FWA device that applies for a particular day during a particular time based on applying the one or more machine learning models to historical eMBB resource data; and receiving a second set of RF coverage data for the FWA device during the particular day and the particular time.

2. The system according to claim 1, the operations further comprising determining the threshold for the FWA device based on historical Enhanced Mobile Broadband (eMBB) resource data for an access point associated with the FWA device.

3. The system according to claim 2, wherein determining the threshold for the FWA device comprises applying one or more machine learning models to the historical eMBB resource data comprising eMBB resource usage by a plurality of user devices that correspond to a cell identity associated with the access point and the FWA device.

4. The system according to claim 1, the operations further comprising: determining that the second set of RF coverage data for the FWA device is below the second threshold; and based on the RF coverage data being below the second threshold, blocking the FWA device from the RRP during the particular day and the particular time.

5. The system according to claim 1, the operations further comprising: determining that the second set of RF coverage data for the FWA device is above the second threshold; and based on the RF coverage data being above the second threshold, including the FWA device for the RRP during the particular day and the particular time.

6. The system according to claim 2, the operations further comprising:

receiving a second set of RF coverage data for a second FWA device;

determining a second threshold for the second FWA device based on a second set of historical eMBB resource data for a different access point associated with the second FWA device, wherein the second threshold for the second FWA device is different than the threshold for the FWA device;

determining that the second set of RF coverage data for the second FWA device is below the second threshold; and based on the second set of RF coverage data being below the second threshold, blocking the second FWA device from the RRP.

7. The system according to claim 1, wherein determining that the RF coverage data for the FWA device is below the threshold is based on a reference signal received power and a signal to interference plus noise ratio corresponding to the FWA device and an access point associated with the FWA device.

8. The system according to claim 7, wherein the reference signal received power and the signal to interference plus noise ratio are received from user devices connected to the FWA device, and wherein the threshold is adjusted based on historical Enhanced Mobile Broadband (eMBB) resource data for the access point.

9. A method for dynamic Radio Resource Partitioning (RRP), the method comprising:

receiving, via a Fixed Wireless Access (FWA) device, a radio frequency (RF) coverage threshold for RRP;

transmitting, via the FWA device, an indication that RF coverage data for the FWA device is below the RF coverage threshold; and receiving, via the FWA device, an indication of exclusion from the RRP based on transmitting the indication;

determining a second threshold for the FWA device that applies for a particular day during a particular time based on applying the one or more machine learning models to historical eMBB resource data; and receiving a second set of RF coverage data for the FWA device during the particular day and the particular time.

10. The method according to claim 9, further comprising:

transmitting a second indication that the RF coverage data for the FWA device is above the RF coverage threshold;

based on transmitting the second indication, receiving a downlink associated with the RRP; and providing a signal to a user device based on receiving the downlink.

11. The method according to claim 9, further comprising:

receiving, via the FWA device, a second RF coverage threshold for the RRP;

transmitting a second indication that RF coverage data for the FWA device is below the second RF coverage threshold; and receiving, via the FWA device, a second indication of exclusion from the RRP based on transmitting the second indication.

12. The method according to claim 9, wherein the indication that the RF coverage data for the FWA device is below the RF coverage threshold includes a signal to interference plus noise ratio that is below the RF coverage threshold.

13. The method according to claim 12, wherein the indication that the RF coverage data for the FWA device is below the RF coverage threshold includes a reference signal received power that is below the RF coverage threshold.

14. One or more non-transitory computer storage media having computer-executable instructions embodied thereon, that when executed by at least one processor, cause the at least one processor to perform a method comprising:

receiving radio frequency (RF) coverage data for a Fixed Wireless Access (FWA) device; determining an RF coverage threshold for the FWA device based on historical Enhanced Mobile Broadband (eMBB) resource data for an access point associated with the FWA device;

determining that the RF coverage data for the FWA device is below the RF coverage threshold; and based on the RF coverage data being below the RF coverage threshold, blocking the FWA device from Radio Resource Partitioning (RRP);

determining a second threshold for the FWA device that applies for a particular day during a particular time based on applying the one or more machine learning models to historical eMBB resource data; and receiving a second set of RF coverage data for the FWA device during the particular day and the particular time.

15. The one or more computer storage media of claim 14, wherein determining the RF coverage threshold for the FWA device comprises applying one or more machine learning models to the historical eMBB resource data comprising eMBB resource usage by a plurality of user devices that correspond to a cell identity associated with the access point and the FWA device.

16. The one or more computer storage media of claim 14, wherein determining that the RF coverage data for the FWA device is below the RF coverage threshold is based on a reference signal received power and a signal to interference plus noise ratio corresponding to the FWA device and the access point.

17. The one or more computer storage media of claim 14, further comprising:

receiving a second set of RF coverage data for a second FWA device; and determining a second RF coverage threshold for the second FWA device based on a second set of historical eMBB resource data for a different access point associated with the second FWA device, wherein the second RF coverage threshold for the second FWA device is different than the RF coverage threshold for the FWA device.

18. The one or more computer storage media of claim 17, further comprising:

determining that the second set of RF coverage data for the second FWA device is below the second RF coverage threshold; and based on the second set of RF coverage data being below the second RF coverage threshold, blocking the second FWA device from the RRP.

19. The one or more computer storage media of claim 17, further comprising:

determining that the second set of RF coverage data for the second FWA device is above the second RF coverage threshold; and based on the second set of RF coverage data being above the second RF coverage threshold, including the second FWA device for the RRP.

* * * * *